United States Patent [19]

Hiramitsu et al.

[11] Patent Number: 4,598,603
[45] Date of Patent: Jul. 8, 1986

[54] STEERING WHEEL

[75] Inventors: Tetsushi Hiramitsu; Hiroshi Sugita; Satoshi Ono, all of Aichi, Japan

[73] Assignee: Toyoda Gosei Co., Ltd., Nishikasugai, Japan

[21] Appl. No.: 645,155

[22] Filed: Aug. 28, 1984

[30] Foreign Application Priority Data

Aug. 29, 1983 [JP] Japan ............................ 58-133349[U]
Sep. 12, 1983 [JP] Japan ............................ 58-141264[U]
Sep. 17, 1983 [JP] Japan ............................ 58-144061[U]

[51] Int. Cl.⁴ ............................ B62D 1/10; B62D 1/16
[52] U.S. Cl. ................................. 74/484 R; 74/409;
74/492; 74/552; 74/802; 200/61.54; 384/428;
403/331
[58] Field of Search ...................... 74/409, 484 R, 492,
74/552, 802; 384/428, 439, 442, 444; 403/331;
200/61.54, 61.57

[56] References Cited

U.S. PATENT DOCUMENTS

| 440,717 | 11/1890 | Mower | 74/802 X |
|---|---|---|---|
| 511,769 | 1/1894 | Gladding | 403/331 X |
| 3,203,390 | 8/1965 | Boda | 74/802 X |

FOREIGN PATENT DOCUMENTS

| 49-17167 | 4/1974 | Japan. | |
|---|---|---|---|
| 57-95232 | 6/1982 | Japan | 200/61.54 |
| 57-198141 | 12/1982 | Japan | 200/61.54 |

*Primary Examiner*—Allan D. Herrmann
*Attorney, Agent, or Firm*—Cushman, Darby & Cushman

[57] ABSTRACT

A steering wheel includes a steering shaft, column and pad sun gears mounted on the steering shaft for rotation relative thereto, a boss plate mounted on the steering shaft between the sun gears and rotatable in unison with the steering shaft, at least one bearing mounted on the boss plate and movable toward and away from a center of the boss plate, a planet shaft rotatably supported by the bearing, and column and pad planet gears mounted on opposite ends of the planet shaft and held in mesh with the column and pad sun gears, respectively, the planet gears having inner side surfaces rotatably held in contact with opposite outer side surfaces of the bearing.

13 Claims, 14 Drawing Figures

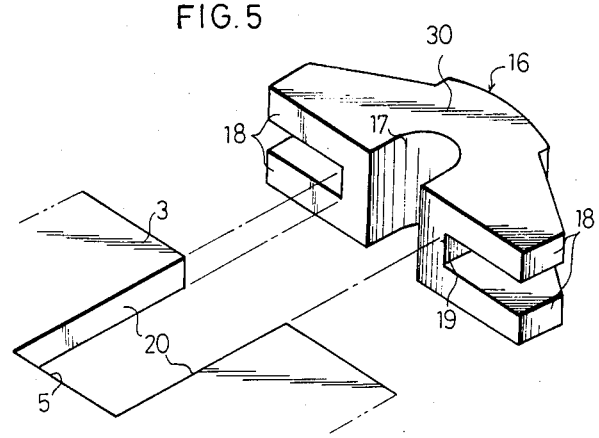
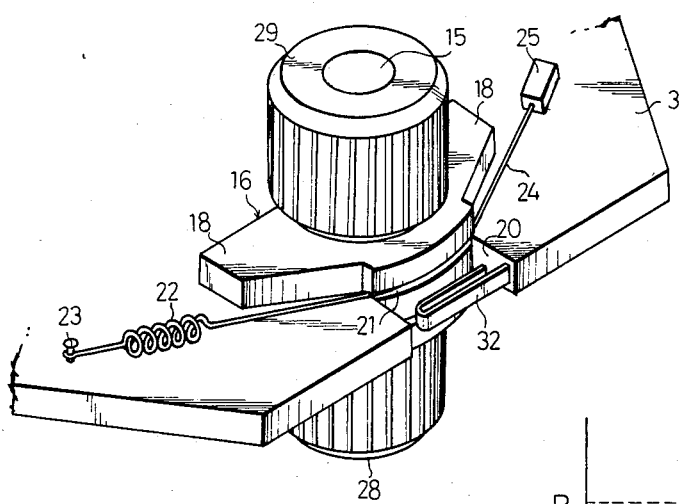
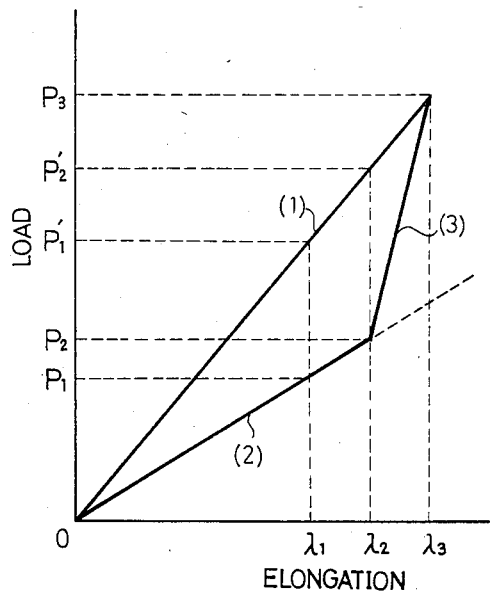
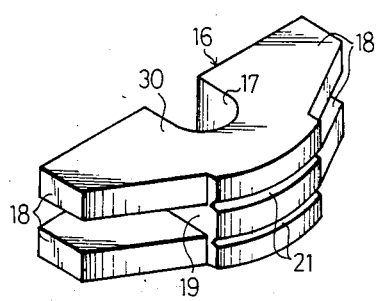

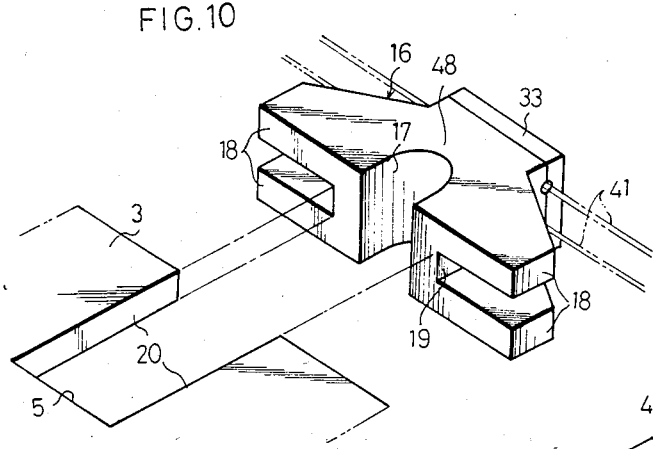
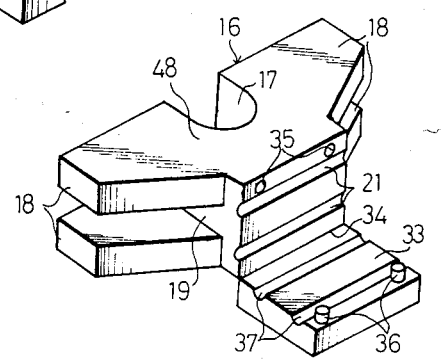
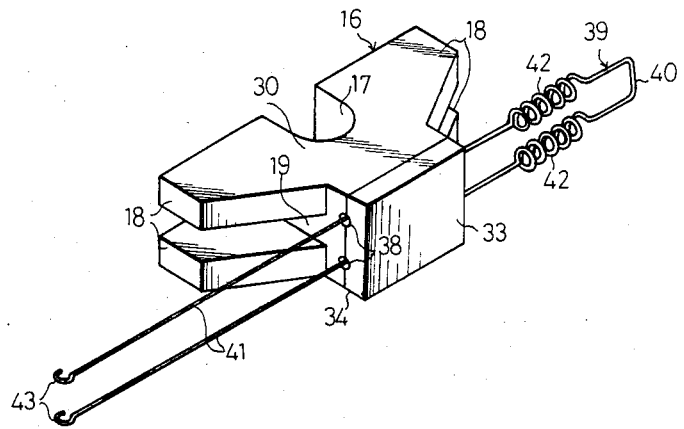

STEERING WHEEL

BACKGROUND OF THE INVENTION

1. Field of the Invention

The present invention relates to a steering wheel having a planetary gear mechanism for keeping a pad nonrotatable, and more particularly to a planet gear support construction.

2. Description of the Prior Art

Steering wheels of the type described are required that the shafts of planet gears be attached rotatably to a boss plate.

One conventional planet gear support construction is shown in FIGS. 1 and 2 of the accompanying drawings. The planet gear support construction includes planet shafts 53 interconnecting planet gears 51, 52 and supported by bearings 56 in attachment recesses 55 defined in edges of a boss plate 54. The bearings 56 are urged inwardly of the recesses 55 by spring members 57 attached to the boss plate 54. With the illustrated construction, the planet gears 51, 52 and the planet shafts 53 can easily be attached to the boss plate 54, and backlashes between the planet gears 51, 52 and sun gears 58, 59 are reduced to prevent wobbling of these gears.

The bearings 56 are positioned in the recesses 55 with outer side walls 56a of the bearings 56 being in abutment against inner side walls 55a of the recesses 55. Therefore, the bearings 56 tend to wobble in the recesses 55 unless the bearings 56 are fitted in the recesses 55 with high fitting accuracy or the boss plate 54 is of an increased thickness. When the bearings 56 are subjected to wobbling, the planet gears 51, 52 and the planet shafts 53 also wobble to allow the pad to move.

SUMMARY OF THE INVENTION

It is an object of the present invention to provide a steering wheel in which planet gears are supported without wobbling to prevent a pad from moving and also the planet gears are prevented easily from axial movement without having to increase dimensional accuracies of bearings of the planet gears and of bearing attaching portions to a degree greater than necessary and to increase the thickness of a boss plate.

Another object of the present invention is to provide a steering wheel which is capable of eliminating a backlash between sun gears and planet gears to prevent vibrations and noise from being generated due to wobbling of the sun and planet gears, which requires no increased steering force, and which prevents the planet and sun gears from being brought out of mesh with each other.

Still another object of the present invention is to provide a steering wheel in which bearings and urging members therefor will not be separated in error upon assembly, and can easily be assembled and maintained.

According to the present invention, there is provided a steering wheel including a steering shaft, column and pad sun gears mounted on the steering shaft for rotation relative thereto, a boss plate mounted on the steering shaft between the sun gears and rotatable in unison with the steering shaft, at least one bearing mounted on the boss plate and movable toward and away from a center of the boss plate, a planet shaft rotatably supported by the bearing, and column and pad planet gears mounted on opposite ends of the planet shaft and held in mesh with the column and pad sun gears, respectively, the planet gears having inner side surfaces rotatably held in contact with opposite outer side surfaces of the bearing.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIGS. 5 through 7 are perspective views of portions of the steering wheel illustrated in FIG. 3;

FIG. 8 is a graph showing load-elongation characteristics of coil and leaf springs in the steering wheel of the invention;

FIG. 10 is a perspective view of a bearing in the steering wheel of FIG. 9;

FIG. 11 is a perspective view of the bearing shown in FIG. 10, with a cover opened;

FIG. 12 is a perspective view of the bearing of FIG. 10, with an urging member attached thereto;

DESCRIPTION OF THE PREFERRED EMBODIMENTS

Figure 4:
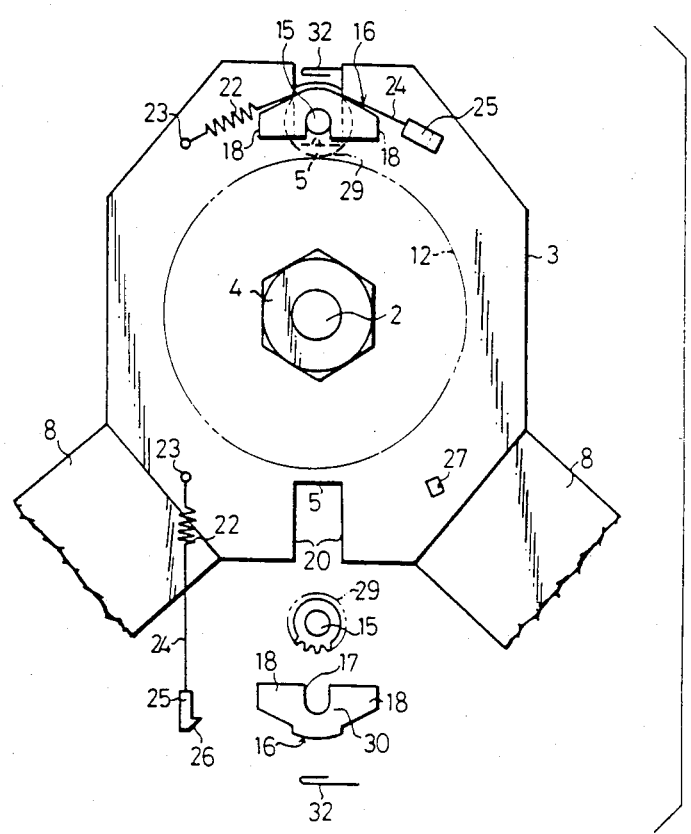
FIG. 4 is a front elevational view of a portion of the steering wheel of FIG. 3.
Figure 9:
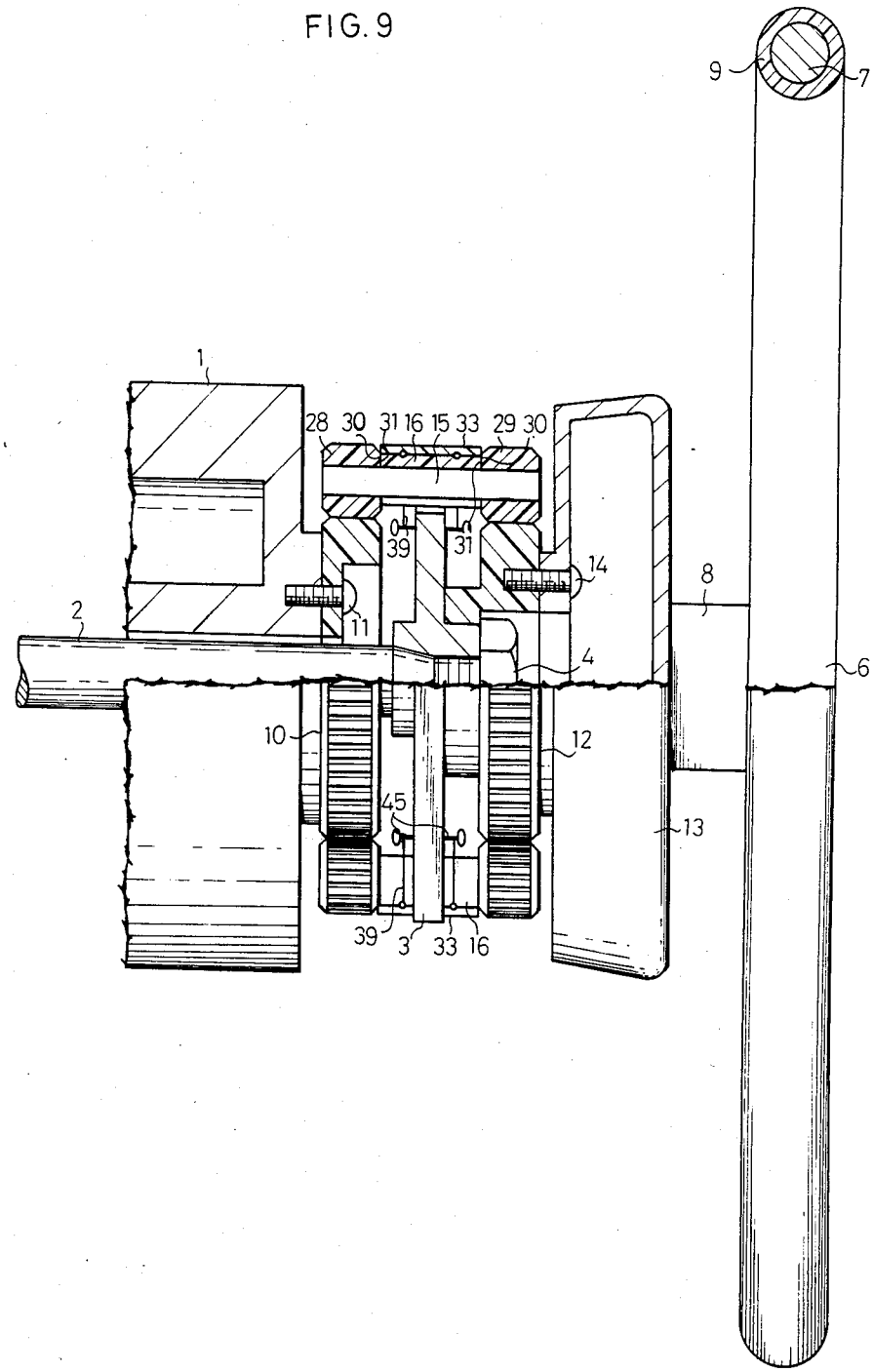
FIG. 9 is a side elevational view, partly broken away, of a steering wheel according to a second embodiment of the present invention.
Figure 13:
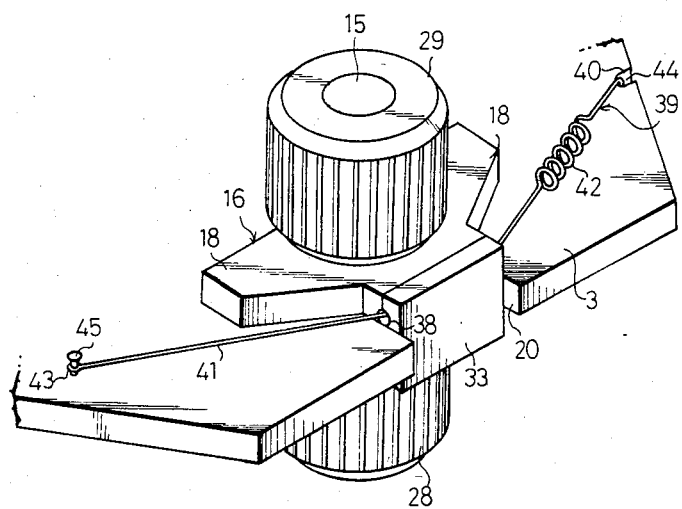
FIG. 13 is a perspective view showing planet gears attached by the bearing of FIG. 10 to a boss plate.

A steering wheel according to a first embodiment of the present invention will be described with reference to FIGS. 3 through 8. A steering shaft 2 extends in and through an automobile column 1. A boss plate 3 is fastened to an end of the steering shaft 2 by a nut 4. As shown in FIG. 4, the boss plate 3 is substantially octagonal in shape, and has attachment recesses 5 defined in upper and lower edges thereof and opening outwardly.

A steering ring 6 includes a core 7 supported on a plurality of spokes 8 extending radially from the boss plate 3 and covered with a urethane surface layer 9.

A column sun gear 10 of synthetic resin, for example, is secured to the column 1 by a plurality of bolts 11, with the steering shaft 2 extending loosely through the center of the sun gear 10. A pad sun gear 12 of synthetic resin, for example, is rotatably supported on the steering shaft 2 by the nut 4, the pad sun gear 12 having the same number of teeth as that of teeth on the column sun gear 10.

A pad 13 for mounting various switches and indicators (not shown) is fastened to the pad sun gear 12 by a plurality of bolts 14. A pair of planet shafts 15 is rotatably mounted by bearings 16 in the recesses 5 in the boss plate 3.

The bearings 16 are made of synthetic resin such as polyacetal and are fitted in the recesses 5. As shown in FIG. 5, each of the bearings 16 has a retaining slot 17 defined in an inner surface and serving as a plain bearing retaining one of the planet shafts 15. Upper and lower flanges 18 integrally project from opposite sides of the bearing 16. The boss plate 3 has portions sandwiched between the upper and lower flanges 18 in substantial abutment thereagainst. The bearing 16 has side surfaces 19 existing between the flanges 18 on the opposite sides of the bearing 16 and held in substantial abutment against inner edges 20 (FIG. 4) of each of the recesses 5 in the boss plate 3. The bearing 16 also has two guide grooves 21 defined in an outer side thereof.

A pair of coil springs 22 is mounted on both sides of the boss plate 3 for each bearing 16. Each of the coil springs 22 has one end fixed by a pin 23 to the boss plate 3 laterally of the recess 5 and includes a straight wire 24 extending continuously from an opposite end thereof. The coil spring 22 and the wire 24 jointly constitute an urging member 39. A locking member 25 is attached to a distal end of each wire 24 and includes a locking prong 26 which engages in a locking recess 27 defined in each of the sides of the boss plate 3 to secure the wire 24 laterally of the recess 5.

Each of the planet shafts 15 is inserted in one of the recesses 5 while being fitted in the retaining slot 17 in the bearing 16. The wires 24 of the coil springs 22 are fitted in the guide grooves 21 and extend in a curved configuration under tension from the coil springs 22, thus urging the planet shafts 15 to move radially inwardly on the boss plate 3.

Column and sun planet gears 28, 29 are mounted on both ends of each of the planet shafts 15 and have the same number of teeth. The column and sun planet gears 28, 29 are held in column and pad sun gears 10, 12, respectively. The planet gears 28, 29 are normally urged by the coil springs 22 on the planet shafts 15 to move toward the sun gears 10, 12. Upon rotation of the boss plate 3 during steering operation, the planet gears 28, 29 rotate about their own axes and revolve around the sun gears 10, 12.

Each bearing 16 has front and rear end faces 30 held lightly against inner end faces 31 of the planet gears 28, 29 for positioning the planet gears 28, 29 to prevent axial movement thereof.

A leaf spring 32 is disposed in an open end of each of the recesses 5 and has a U-shape spaced slightly from the bearing 16 by a distance which is equal to or smaller than twice the module of the gears 10, 12, 28, 29, but preferably equal to or smaller than the module thereof in practice. If the planet gears 28, 29 were spaced from a position in which they properly mesh with the sun gears 10, 12 by a distance greater than the module against the resiliency of the coil springs 22, the gears 10, 12, 28, 29 would not mesh properly. If the gears 28, 29 were spaced from the gears 10, 12 a distance greater than twice the module, the gears 10, 12, 28, 29 would be out of mesh with each other. The leaf springs 32 serve as retainers to prevent the gears 10, 12, 28, 29 from being brought out of mesh.

The spring characteristics of the coil springs 22 and leaf springs 32 will be described with reference to FIG. 8.

Figure 1:
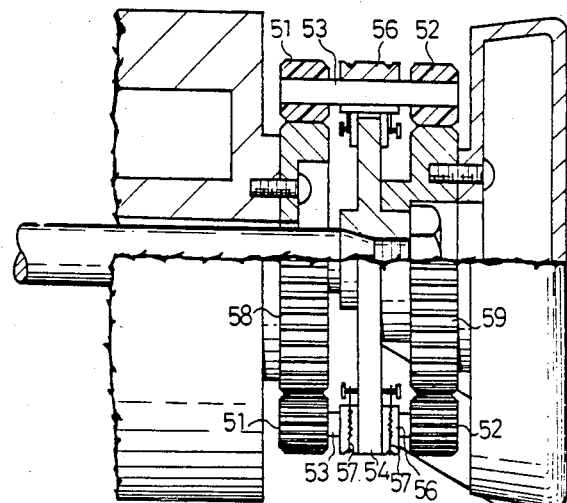
FIG. 1 is a side elevational view, partly cut away, of a conventional steering wheel.
Figure 2:
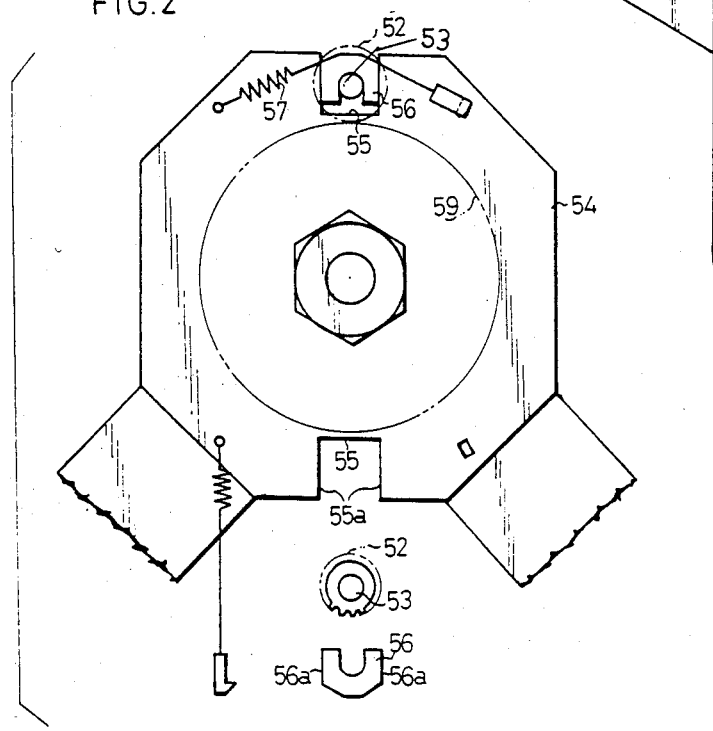
FIG. 2 is a front elevational view of a portion of the steering wheel shown in FIG. 1.
Figure 3:
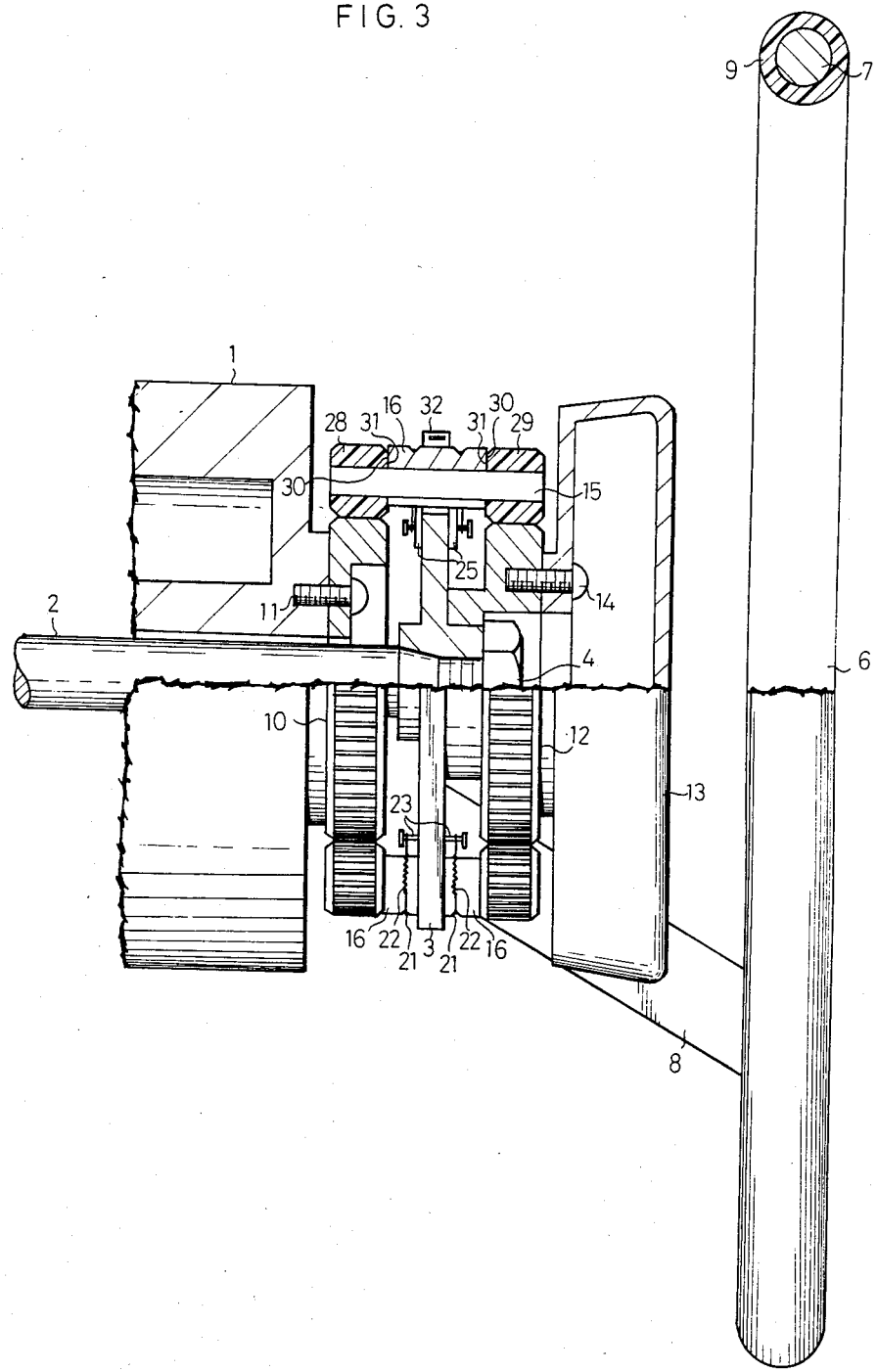
FIG. 3 is a side elevational view, partly cut away, of a steering wheel according to a first embodiment of the present invention.

The graph has a vertical axis indicative of loads P imposed by the springs to press the planet gears 28, 29 against the sun gears 10, 12, and a horizontal axis of elongations $\lambda$ of the springs. A curve (1) represents the spring characteristics of the spring 57 in the conventional steering wheel illustrated in FIGS. 1 and 2. A curve (2) represents the spring characteristics of the coil spring 22 in the embodiment of the invention. A curve (3) indicates the added spring characteristics of the coil spring 22 and the leaf spring 32 in which the coil spring 22 is elongated more than $\lambda_2$ to press the outer side of the bearing 16 against the leaf spring 32. The horizontal axis of the graph is only indicative of the elongation of the coil spring 22. The curve (3) thus indicates apparent spring characteristics of the coil spring 22 reinforced by the leaf spring 32.

With respect to the characteristic curves (2) and (3), when the planet gears 28, 29 are held in proper mesh with the sun gears 10, 12 under pressure, the coil springs 22 are elongated $\lambda_1$, imposing a load $P_1$ on the bearings 16.

When the planet gears 28, 29 are displaced radially outwardly due to meshing pressure or dust or small foreign matter trapped between the gears to cause the bearings 16 to be held against the leaf springs 32, the coil springs 22 are elongated $\lambda_2$, imposing a load $P_2$ on the bearings 16. When the planet gears 28, 29 are displaced further radially outwardly, the leaf springs 32 being imposing a load on the bearings 16. The load is quickly increased from $P_2$ to $P_3$ as the elongation of the coil springs 22 is increased from $\lambda_2$ to $\lambda_3$. This increase corresponds to a condition in which the planet gears 28, 29 are spaced from the sun gears 10, 12 immediately before they are brought out of mesh. The load $P_3$ is a minimum load or more which is required for preventing the gears from being brought out of mesh.

According to the curve (1) of the conventional arrangement, the gears are prevented from being displaced out of mesh only by the spring members 57 (the load is $P_3$ when the spring elongation is $\lambda_3$). Therefore, when the gears are in proper mesh (the elongation is $\lambda_1$), the load is $P_1'$ which is higher than $P_1$ of the embodiment of the invention, and the planet gears are in mesh with the sun gears under greater pressure.

When the steering wheel thus constructed is turned, the planet gears 28, 29 rotate about their own axes and revolve around the sun gears 10, 12 while the planet gears 28, 29 are being pressed against the sun gears 10, 12, as described above, the pad 13 securd to the pad sun gear 12 is not turned with respect to the column 1. Since any backlash between the gears 10, 12, 28, 29 is eliminated by the coil springs 22, any vibrations and noise which would otherwise be produced by the gear backlash are prevented from being generated.

While the steering wheel is in operation, the side surfaces 19 of the bearings 16 are substantially held against the inner edges 20 of the recesses 5 and the boss plate 3 is sandwiched between the flanges 18 in slight abutment thereagainst. Therefore, any wobbling of the bearings 16 with respect to the boss plate 3 is prevented. This arrangement is effective in preventing the bearings 16 from wobbling in the case where the dimension accuracies of the bearings 16 and the recesses 5 are not appreciably high and the boss plate 3 is of a reduced thickness.

Therefore, the planet shafts 15 do not wobble and hence the pad 13 does not move with respect to the column 1.

Furthermore, the planet gears 28, 29 are prevented from being axially moved since the front and rear end faces 30 of the bearings 16 are in light contact with the inner end faces 31 of the planet gears 28, 29.

As described above, the planet gears 28, 29 are held in normal mesh with the sun gears 10, 12 under a pressure smaller than that in the conventional arrangement. As a consequence, the resistance to rotation of the planet gears 28, 29 and hence the force with which the steering wheel is operated are not increased. Even when the planet gears 28, 29 are displaced radially outwardly by meshing pressure or small foreign matter such as dust particles trapped between the gears, the planet gears 28, 29 are pressed radially inwardly by the coil springs 22 and the leaf springs 32, so that the gears 10, 12, 28, 29 will not be forced out of mutual mesh.

The present invention is not limited to the construction of the above embodiment, but may be subject to various modifications. For example, the shapes of the bearings 16 may be changed. Any desired urging members in addition to the coil springs 22 may be employed for pressing the planet gears 28, 29. Any desired limiting members in addition to the leaf springs 32 may be employed for preventing the gears from being displaced out of mesh.

A steering wheel according to a second embodiment of the present invention will be described mainly for those portions different from the steering wheel of the first embodiment with reference to FIGS. 9 through 14.

A cover 33 covers an outer side surface of a bearing 16 and is integrally formed through a hinge 34 with the bearing 16, the cover 33 being openable and closable by and about the hinge 34. The bearing 16 has locking holes 35 defined in the outer side surface thereof. The cover 33 has locking pins 36 on an inner surface thereof. The cover 33 is locked in the closed position with respect to the bearing 16 by the locking pins 36 fitted in the locking holes 35. The cover 33 has two guide grooves 37 defined in the inner surface thereof. When the cover 33 is closed, the guide grooves 37 and guide grooves 21 in the outer surface of the bearing 16 confront each other and define guide holes 38.

An urging member 39 in the form of a metal wire is attached to the bearing 16 and has a substantially C-shaped engaging portion 40 at one end thereof. The urging member 39 includes two wires 41 extending from the engaging portion 40 and slidably fitted in the guide holes 38. Each of the wires 41 has an integral coil spring 42 and an integral hook 43 on an end thereof.

The engaging portion 40 is retained in a recess 44 defined in an outer edge of the boss plate 3, and the hooks 43 are hooked on pins 45 on both sides of the boss plate 3. With such an arrangment, the urging member 39 engages the bearing 16 in a curved configuration under tension to urge the bearing member 16 and the planet shaft 15 into the recess 5.

The manner in which the planet gears 28, 29 and other components in the steering wheel of the second embodiment are assembled will be described. First, the planet gears 28, 29 are attached to the ends of each of the planet shafts 15. The wires 41 of the urging member 39 are fitted in the guide grooves 21 in the bearing 16, and then the cover 33 is closed, thereby assembling the urging member 39 in the bearing 16.

The planet shaft 15 with the planet gears 28, 29 mounted thereon is fitted in the bearing 16, which is then fitted in the recess 5 in the boss plate 3. The planet gears 28, 29 are brought into mesh with the sun gears 10, 12. The hooks 43 are hooked on the pins 45, and the engaging portion 40 is retained in the recess 44 while the coil springs 42 are being elongated.

Since the urging member 39 is assembled in the bearing 16, they will not be separated or dropped in error upon assembly, and can easily be supported. Therefore, the urging member 39 and the bearing 16 can be assembled and maintained with ease.

The cover 33 is easily integrally formed with the bearing 16, and the urging member 39 can simply be assembled into the bearing 16.

When the steering wheel of the second embodiment is turned, the planet gears 28, 29 rotate about their own axes and revolve around the sun gears 10, 12 while the planet gears 28, 29 are being pressed against the sun gears 10, 12, so that the pad 13 does not rotate with respect to the column 1. Since any backlash between the gears 10, 12, 28, 29 is eliminated by the coil springs 42, any wobbling which would otherwise be produced by the gear backlash are prevented from being generated.

The present invention is not limited to the arrangement of the second embodiment, but may be varied as follows:

(1) The bearing 16 may be varied in shape and construction. For example, the flange 16 may have only one pair of flanges 18, and the cover 33 may be a separate member detachably mounted on the bearing 16.

Figure 14:
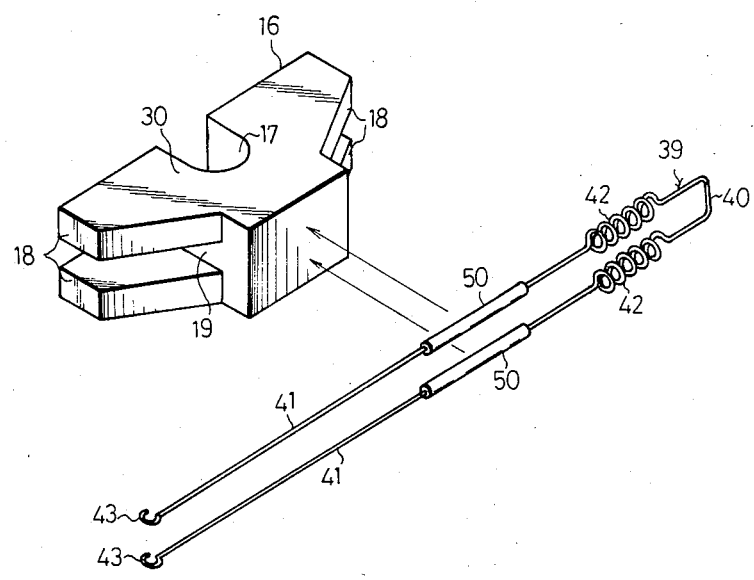
FIG. 14 is a perspective view of a bearing to which an urging member is attached according to a modification.

(2) As shown in FIG. 14, the bearing 16 may be a flat or grooved outer side surface, and pipes 50 may be fitted loosely over the wires 41 of the urging member 39. After the pipes 50 have been heated to a softening temperature of the synthetic resin of which the bearing 16 is made, the pipes 50 are pressed against the outer side surface of the bearing 16 to soften the bearing 16 until the pipes 50 can be embedded therein. The urging member 39 is then slidably mounted on the bearing 16.

(3) The urging member 39 may be mounted on the bearing 16 in other appropriate manners.

Although certain preferred embodiments have been shown and described, it should be understood that many changes and modifications may be made therein without departing from the scope of the appended claims.

What is claimed is:

1. A steering wheel comprising:
   (a) a steering shaft;
   (b) column and pad sun gears mounted on said steering shaft for rotation relative thereto;
   (c) a boss plate mounted on said steering shaft between said sun gears and rotatable in unison with said steering shaft;
   (d) at least one bearing mounted on said boss plate and movable toward and away from a center of said boss plate;
   (e) a planet shaft rotatably supported by said bearing; and
   (f) column and pad planet gears mounted on opposite ends of said planet shaft and held in mesh with said column and pad sun gears, respectively, said planet gears having inner side surfaces rotatably held in contact with opposite outer side surfaces of said bearing.

2. A steering wheel according to claim 1, wherein said boss plate has an attachment recess in which said bearing is disposed.

3. A steering wheel according to claim 2, wherein said bearing has transversely spaced flanges held respectively against opposite outer side surfaces of said boss plate in a transverse direction thereof.

4. A steering wheel according to claim 2, including an urging member for urging said bearing in a direction to press said planet gears respectively against said sun gears.

5. A steering wheel according to claim 4, wherein said urging member comprises a pair of wires engaging an outer surface of said bearing on opposite outer side surfaces of said boss plate in a transverse direction thereof for urging said bearing, and a pair of coil springs integrally formed with said wires, respectively, between opposite ends thereof, said opposite ends of said wires being retained on said boss plate.

6. A steering wheel according to claim 5, wherein said pair of wires has on one end thereof an engaging portion retained in a recess defined in a portion of said boss plate.

7. A steering wheel according to claim 5, wherein said wires are longitudinally slidable with respect to said bearing and retained thereon against removal therefrom.

8. A steering wheel according to claim 7, wherein said bearing has a pair of guide grooves defined in an outer side surface thereof and engaging said wires, and a cover covering said outer side surface of the bearing for preventing the wires from being detached outwardly from said bearing.

9. A steering wheel according to claim 8, wherein said bearing and said cover are integrally formed through a hinge interposed therebetween, said cover being openable and closable by and about said hinge with respect to said bearing.

10. A steering wheel according to claim 7, wherein said bearing has a pair of pipes on an outer side surface thereof with said wires extending through said pipes, respectively, said wires being slidable through said pipes with respect to said bearing.

11. A steering wheel according to claim 4, further including a retainer for preventing said bearing from moving away from the center of said boss plate so that said planet gears will not be displaced out of mesh with said sun gears.

12. A steering wheel according to claim 11, wherein said retainer comprises a leaf spring disposed in said attachment recess for engaging and pressing an outer surface of said bearing when the bearing is moved away from the center of said boss plate.

13. A steering wheel according to claim 12, wherein said leaf spring is spaced from said outer surface of said bearing by a distance which is equal to or smaller than twice the module of said sun gears and said planet gears.

* * * * *